United States Patent [19]

Guenther

[11] 4,212,457
[45] Jul. 15, 1980

[54] PRE/POST-COLLATION COPYING SYSTEM
[75] Inventor: Joachim Guenther, Webster, N.Y.
[73] Assignee: Xerox Corporation, Stamford, Conn.
[21] Appl. No.: 890,097
[22] Filed: Mar. 27, 1978
[51] Int. Cl.$^2$ .................. B65H 31/24; B65H 29/60
[52] U.S. Cl. .................................. 271/288; 271/4; 355/14 SH
[58] Field of Search ............... 271/173, 3.1, 4, 64, 271/288, 289, 290, 287, 298; 355/14, 14 R, 14 SH

[56] References Cited
U.S. PATENT DOCUMENTS

| | | | |
|---|---|---|---|
| 3,556,511 | 1/1971 | Howard et al. .................. | 271/4 |
| 3,870,295 | 3/1975 | Kukucka ......................... | 271/173 |
| 3,944,207 | 3/1976 | Bains .............................. | 271/173 X |
| 4,012,032 | 3/1977 | Rogers ............................ | 271/173 X |
| 4,062,061 | 12/1977 | Batchelor et al. ............... | 355/14 X |
| 4,078,787 | 3/1978 | Burlew et al. .................. | 271/3.1 |

OTHER PUBLICATIONS

*Understanding Digital Electronics,* Texas Instruments Learning Center, Radio Shack, 1978, (pp. 1–19, 9–16, 9–17, 9–18).

*Primary Examiner*—Bruce H. Stoner, Jr.

[57] ABSTRACT

A dual mode copier which automatically switches the recirculating document handler and copy output system between pre-collation and post-collation modes of operation in response to a selection in the copy counter control of a number of copies which exceeds a pre-set crossover copy count, but which provides a first pre-collation proof set in both modes.

8 Claims, 1 Drawing Figure

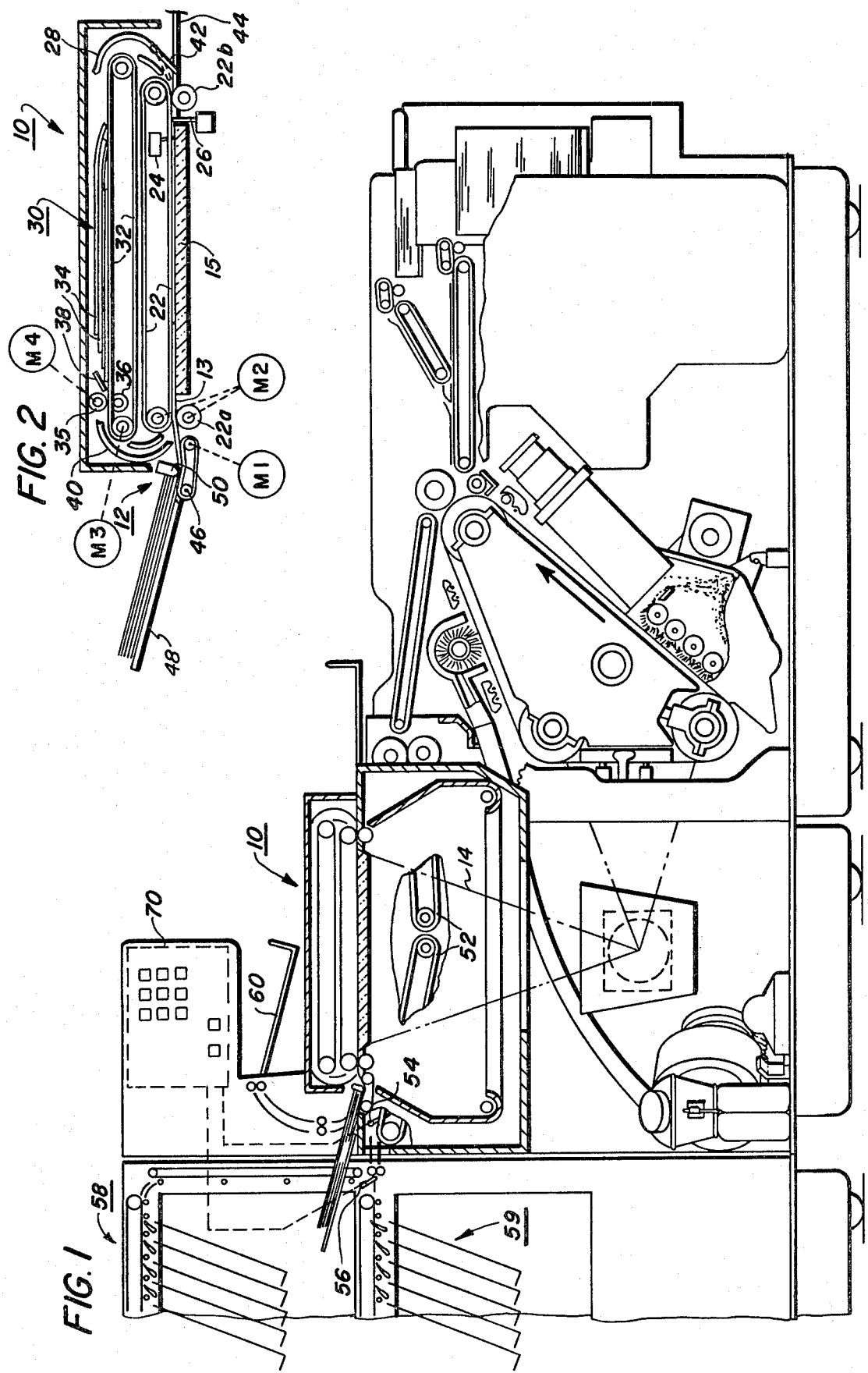

PRE/POST-COLLATION COPYING SYSTEM

This invention relates to a copier in which the recirculative copying mode of the documents and the handling of the copy sheets is switched between pre-collation and post-collation copying modes.

For the faster xerographic and other copiers now in commercial use it is increasingly desirable to provide automatic handling of the individual original documents being copied in order to utilize those higher speed copying capabilities. However, the documents can vary widely in characteristics and condition, and must be protected against damage, excessive wear, or smearing of the marking indicia thereon. Most document sheet recirculators have an increased likelihood of document wear or damage or mis-registration or mis-separation with an increase in the number of times the sheets are recirculated, particularly if the sheets must be separated during each recirculation.

A known desirable feature for an automatic document handling system for a copier is to provide document recirculations for pre-collation copying. As discussed, for example, in detail in U.S. Pat. No. 3,963,345, issued June 15, 1976, to D. J. Stemmle et al., at Columns 1-4, and the art cited therein, such pre-collation copying systems provide a number of important advantages. The copies exit the copier into a set collector already in pre-collated sets, and do not require subsequent sorting in a sorter or collator. On-line finishing and/or removal of completed copy sets may be provided while additional copy sets are being made from the same document set. Any desired number of such copy sets may be made by making a corresponding number of recirculations of the document set in collated order past a copying station and copying each document once each time it recirculates. A complete copy proof set is available from the first document set circulation.

However, a disadvantage of pre-collation copying systems is this fact that the documents must all be repeatedly recirculated and repeatedly individually copied a number of times equivalent to the desired number of copy sets. For example, to make 10 copy sets of a 5 page document set or book, one copy at a time would be made of each of the 5 document pages in this order: pages 1, 2, 3, 4, 5; 1, 2, 3, 4, 5; (or the reverse) repeated a total of 10 times to make the desired 10 copy sets. Thus, increased document recirculations are necessitated for a pre-collation copying system, with consequent increased likelihood of document jams and document wear or damage.

This is in contrast to a conventional post-collation copying system in which a large number of the desired copies are made at one time from each document page and collated subsequently. In such a post-collation copying system the document set need only be circulated once to load the bins of the copy sheet sorter (collator) with collated copy sets, but limited in number by the number of the bins. If two sets of bins are provided, then as one set of bins are being emptied, another may be being filled in another document set circulation. This is further described, for example, in U.S. Pat. No. 3,944,207, issued Mar. 16, 1976 to S. S. Bains. It is called "Limitless Sorting". For example, for 75 copies with two 25 bin sorter units, 25 identical copies may be made at one time from each document in one circulation of the document set, and one copy of each document put in a separate one of the 25 sorter bins, until all the documents have been copied, to provide completed copy sets in all 25 bins. Then the documents may be circulated a second time to make 25 more copies, all diverted to the second 25 bin sorter unit.

Then, after the copies are all removed from the first sorter unit, it may be refilled again with the third 25 copy sets to complete the 75 copy run on a third document set recirculation.

The present invention is intended to overcome or minimize the above discussed and other problems and disadvantages by automatically switching from a pre-collation copying system to a post-collation copying system in response to the request for a number of copies in excess of a pre-settable crossover copy count threshold level at which it is more desirable to be in one copying mode rather than the other.

In addition to the other patents cited herein, other multi-mode copiers with different modes of document copying are known, e.g. U.S. Pat. Nos. 3,844,654, issued Oct. 29, 1974 to J. Guenther and 4,018,523, issued Apr. 19, 1977 to E. L. Hughes. U.S. Pat. No. 4,012,032, issued Mar. 15, 1977 to J.C. Rogers discloses switching between a post-collated output to sorter bins and an uncollated output to an overflow bin for copies in excess of the number of bins. U.S. Pat. No. 4,078,787, issued Mar. 14, 1978 to L. E. Burlew et al. teaches switching from collate to noncollate copying modes. However, none of these patents suggest automatic switching between pre and post-collation copying modes at a copy count level.

Further objects, features and advantages of the present invention pertain to the particular apparatus and steps whereby the above-mentioned aspects of the invention are attained.

Accordingly, the invention will be better understood by reference to the following description and to the drawings forming a part thereof, wherein:

FIG. 1 is a side view of an exemplary conventional xerographic copying apparatus with an automatic document recirculation system in accordance with the present invention, and;

FIG. 2 is an enlarged side view of the recirculating document handling unit in FIG. 1.

FIGS. 1 and 2 illustrate one example of the present invention. The exemplary automatic original document sheet recirculator 10 here is further described in more detail in U.S. Pat. No. 4,093,372, filed Mar. 28, 1977 by Joachim Guenther as Ser. No. 781,811. However, it will be appreciated that the document recirculation system may have many other different orientations and structures, and many different combinations with different xerographic or other copying systems. Other examples of document recirculation systems are disclosed in U.S. Pat. Nos. 3,941,376, issued Mar. 2, 1976 to K. Liechty; 3,536,320, issued Oct. 27, 1970 to D. R. Derby, etc.

In the automatic document handling system 10, a set of documents may be loaded, contained, and automatically recirculated by a desired number of recirculations. The individual documents may be exposed for copying in each recirculation of the document set. The documents illustrated here are conventional full size sheets of paper. The documents may be loaded into the RDH unit 10 at a loading or input area 12. The individual documents, such as 13, are then carried through the optical imaging station 14 of a conventional copier optics system, over an illuminated copying image platen 15. A lens focuses the image of the document being copied on the platen onto a photoreceptor in the copier through a conventional mirror arrangement as shown in FIG. 1.

The documents 13 to be copied, as shown in FIG. 2, are transported over the platen by an endless conventional document belt system 22 driven by a motor M2. There is a document lead edge sensor and sheet counter 24 and a retractable lead edge registration gate 26. The lead edge of the document may be sensed at switch 24 to stop the drive motor M2 and raise the registration gate 26 to stop the document 13 at the appropriate exposure position. Mating rollers 22a and 22b engage the document transporting lower flight of the belt 22 at its entrance and exit areas, respectively, to provide document nips there.

As is known in the art, a hinged mounting arrangement may be provided for the entire RDH unit, to allow it to pivot away from the platen, thereby allowing unobstructed manual multiple copying of documents on the platen.

After the document has been copied, it is guided and turned over in a 180° semi-circular path by a curved baffle or paper guide 28. Then the document is immediately stacked onto the top of a shingled set 30 of all of the other individual documents being recirculated. The document set 30 is supported on, and transported by, a second, separate, belt transport system 32, comprising a spaced pair of belts, differently driven by motor M3.

The motor M3 incrementally advances the second belt system 32 by a brief distance (e.g. one centimeter) once before each document received from the belt unit 22 is stacked on on the top of the set 30. This short belt movement each time another document is placed on the belts 32 causes each document in the set 30 to be off-set or shingled relative to all of the other documents in the set 30. Thus, to advance an individual document being recirculated from the set 30 no re-separation of the documents is required. A simple, non-separation type document feeder may be utilized. Here feed rollers 35 and 36 are driven by the motor M4 whenever it is desired to recirculate a document from the set 30 back onto the platen for its individual copying. The incremental movement of the belt transport 32 by the motor M3 advances the exposed lead edge area 34 of only the bottom-most document in the set 30 into the nip of the feed rollers 35 and 36. The rollers 35 and 36 are mounted centrally between the two belts 32.

As the lower-most document in the set 30 is fed out therefrom by the feed rollers 35 and 36, it enters a second curved sheet guide or baffle 40 which again inverts the document in a short 180° curved path, and brings the lead edge of the document directly into the loading or input area 12 for exposure and copying.

The above-mentioned operation and steps may be endlessly repeated to provide any desired number of copying recirculations of the document set 30 in the system, and thereby provide any desired number of pre-collated output copy sets.

After the desired number of document recirculations have been provided, i.e. after the desired number of copy sets have been made, all of the documents in the document set may be automatically ejected after their last copying, as a part of the last document recirculation. This is accomplished here by pivoting the deflector finger 42 shown into the illustrated dashed line position, where it is not in the path of the documents as they exit the platen 15, to cause the documents to eject into, and stack in, a document exit tray 44.

Turning now to the initial loading of the set of documents to be recirculated into the automatic document handling system 10, this may be done manually or semi-automatically at the input area 12. However, preferably as shown here, a conventional automatic document sheet feeder 46 is driven by motor M1 to load individual sheets into the document handler 10 from a set of documents placed in a document input tray 48. The input feeder 46 here includes a separator 50 for separating and sequentially feeding only individual sheets from the bottom of the unseparated stack of sheets placed in the input tray 48. With the system here, the documents are sequentially loaded in order directly onto the platen 15, and thus a "proof-set" of copies may be completed as the loading of the document set is accomplished, and the number of documents in the set can be automatically counted at the switch 24 or elsewhere.

It will be appreciated that the motors M1–M4 illustrated may be gear, cam, clutch, etc., driven elements from only one or more power sources, rather than separate motors.

Turning now to the copy sheet output system and its control, FIG. 1 illustrates a copy output system very similar to that of the Xerox Corporation "9200" and "9400" duplicators. Finished (fused) copy sheets exit the copier in sequence on a transport 52 past a first switchable (pivotable) sheet deflector 54. If not deflected there the sheets pass onto a second switchable deflector 56 which determines which of two sets of sorter bins will receive the sheets. Here there is an upper sorter unit 58 and a lower sorter unit 59. Within each sorter unit further individual switchable deflectors determine which of the individual bins will receive the copy sheet.

If the sheets are deflected by the deflector 54 out of the path to the sorter, they are sent to a separate copy set collector 60 instead. This may be a single large capacity tray, as shown, or an accumulator or compiler for an on-line stapler, stitcher or binder.

An inverter may be conventionally provided in the copy sheet output path. Its automatic actuation by the controller will depend on whether or not the documents or copies are duplexed (2 sided) and the copying order of the documents (pages N to 1 vs. 1 to N) in a known manner.

The operation of all of the copy sheet path selectors, i.e. here the deflectors 54, 56, etc. is controlled by a control unit 70. This includes both manual inputs by the operator to the illustrated external switches or buttons and internal controls settable by the machine technician or at the factory or automatically switched in response to certain predetermined machine conditions and operator input combinations.

One example of a desirable control unit 70 is that utilized in the Zerox Corporation "9400" duplicator. Noted in regard to such programmable controllers is U.S. Pat. No. 4,062,061, issued Dec. 6, 1977 to P. J. Batchelor et al. Another example of a copier controller is desribed in U.S. Pat. No. 3,936,182, issued Feb. 3, 1976 to S. Sheikh. Other examples are in the art cited above.

The controller 70 here includes a conventional copy counter control input for selecting the number of copies that are to be produced by the copier from the documents. This is accomplished by the operator pushing the illustrated console buttons for that number. With the present invention, the control unit 70 additionally includes novel switching functions within its internal program, or in separate logic circuits of conventional components. Specifically, it contains a pre/post-collation switching means for automatically switching the copier between a pre-collation mode of operation and a post-collation mode of operation.

As to the copies, in the pre-collation mode of operation, the copies produced are routed as previously described to the copy set collector 60 to provide a stack of pre-collated copy sets of the number of copies selected. In the post-collation mode of operation, the uncollated copies are routed to bins of one of the two sets of sorter bins, 58 or 59, selected by the controller 70. It will be appreciated that, although less desirable, a sorter with only a single set of bins could be used instead.

As to the documents, in the pre-collation mode of operation, each document is copied once in each document circulation and the set of documents is multiply recirculated for this single copying by a number of recirculations equal to the number of desired copy sets selected by the copy counter control, for simplex documents, or twice that for duplex documents. The copies produced in the pre-collation copy mode are thus forwarded to the copy set collector already in a pre-collated order. However, significantly, with the present invention this pre-collation copy mode is limited to a pre-set crossover copy count. That cross-over level is variably presettable by the operator or by the technical representative in the copy counter control or elsewhere in the controller 70. In response to a selection in the copy counter control of a number of copies which exceeds this present crossover copy count, the internal pre/post-collation switching circuit is automatically actuated to switch the operation of the copier between the above-described pre-collation mode of operation and the above-described post-collation mode of operation.

The circulation and copying of the documents and the handling of the copy sheets is all directly controlled by the electrical connection of the above-described copy sheet path selectors and the circulating document handling unit 10 to the control unit 70. These units may all be commercially electrically driven by solenoids or motors or electrically controlled pneumatics.

The crossover copy count for pre/post-collation mode switching may be dialed or set into the copy counter control using the same copy count buttons by which the number of copies are normally selected, by depressing an additional button on switch on the console which causes that count information to be programmed to the crossover switching function instead.

The selected pre-set crossover copy count will depend on the particular copier and the particular customer usage patterns, varying between approximately 20 and 50 copies. In general, the determining factors are the relative speed and the reliability of the recirculating document handling unit. Where it is a low cost RDH with a relatively high document jar or wear rate per document set circulation the crossover count will be relatively low, e.g. 20 copy sets. With that crossover the copier would automatically operate in a pre-collation mode of operation when less than 20 copies are being made of any document set. It would automatically switch to a post-collation mode of operation when 20 or more copies are being made. The crossover count will also be low if the document handling unit is too slow to switch documents in the time interval between document exposures of the copier (i.e. its copying rate). A lower crossover keeps the overall productivity of the machine from being lowered by long copying runs in a pre-collation mode which is slower than the post-collation mode in this case.

On the other hand, if the RDH is as fast as the copier and can reliably recirculate and register documents with low wear and jam rates for a large number of recirculations, then the crossover switching count would desirably be pre-set to a much higher level, e.g. 50 copies.

It will be appreciated that there are also provided manual switch means on the console for manually overriding the above-described automatic pre-collation/post-collation switching means. Thus, for example, if the documents to be copied are themselves durable copies for which wear or damage is not important, and/or if pre-collation operation for on-line finishing is desired even though a large number of copies are to be made, in excess of the pre-set crossover level, this can be provided simply by pushing an operator button to that effect. In the same manner, post-collation copying may be provided for a small number of copy sets even though below the normal crossover level.

An additional, manually selectable mode of operation may be provided by additional operator switching means on the console for switching the routing of the copy sheets in the pre-collation mode of operation from the copy collector to the sorter, and for putting one pre-collated copy set in each bin. This may be utilized, for example, for continuing pre-collation copying while sets are being removed from the copy collector 60. It may also be utilized where cover, insert or separation sheets (pre-printed or colored or transparent and/or heavier sheets from a different source than the copy sheets) are manually or automatically placed in the bins on one or both sides, and/or internally of, each copy set. When the bins are so utilized for pre-collation copying, they are filled one at a time and sets may be removed from the filled bins for various finishing operations while the downstream bins are being filled, unlike the normal post-collation use of the sorter, in which no sets can be removed until all sets are completed in that sorter unit.

An important additional feature of the above-described dual mode copying system is that the copier is automatically temporarily held in a pre-collation copy mode to produce one pre-collated copy proof set for the first copy set regardless of whether or not the above-described pre/post-collation switching means is in a pre-collation or post-collation mode of operation. That is, the first copy set is made in a precollated mode regardless of the number of copies selected in the copy counter control and regardless of crossover copy count, i.e. upon the initiation of copying, the control 70 automatically recirculates the document set in the document handling unit in a first complete single circulation in which all of the documents are copied only once. That first copy set is then routed to the copy set collector 60, to provide a proof set for review by the operator, while the machine then automatically continues to make the remaining number of selected copies in either a pre-collation mode or post-collation mode, depending on the above-described operation of the pre/post-collation switching means.

By way of an example and summary, the operation of the above-disclosed system will be reviewed for one specific case, as follows: Assume that the pre/post-collation switching means has been pre-set with a crossover count of 20; assume further that the operator selects 40 copy sets on the copy count control console; assume that there are two sorter units of 25 bins each; and assumes that none of the previously described manual override switches have been actuated. The machine will then automatically proceed as follows without any further manual input. First, the document handling unit will recirculate the documents once and the copier will make one copy each and place that single proof set copy in the pre-collation output. The machine then automatically switches to the post-collation mode because the crossover level of 20 copies is exceeded by the 40 copies required in this example. Thus, the document handling unit automatically next begins a second document recirculation in which each document is held over the platen until it has been copied 25 times in sequence, since the number of copies made in any circulation is limited to the 25 bin capacity of the sorter unit. Each of the 25 identical copies are placed in a separate individual bin of the selected sorting unit. Thus, upon the completion of the second document set circulation by the document handling unit 25 more completed copy sets are available for removal from the 25 bins of that sorting unit. The machine then immediately automatically proceeds in this example with a third document set circulation in which the remaining 14 requested copies are made from each of the documents and collated in 14 of the bins of the second (other) sorter unit.

It may be seen that in the above example, utilizing the automatic switching of the copier into a post-collation moade after the first copy set, that only three document set circulations are required, yet 40 collated copy sets are provided and an initial pre-collated proof set is promptly provided before all of the other copying occurs, even though the sorter unit capacity is only 25 bins. In contrast, if the copies had all been made in a conventional pre-collation mode the documents would have had to have been recirculated 40 times, with increased jam or wear risks, and for many RDH units, increased total copying time (lower through-put).

A further alternative and superimposable automatic mode of operation, also operator switch selectable, will now be described. As is well known, the sorter units contain a common optical or other sensing means to provide an electrical signal to the controller indicating whether the copies have all been removed from the bins, or whether any are still present. As previously indicated, a signal is also available indicative of the selection of a number of copies in the copy counter exceeding the number of bins. Thus, a further operating mode may be provided responsive to these two condition signals. Specifically, if the machine had filled all the bins but not completed the selected copy run in a post-collation mode, and the bin sensors indicate that neither sorter unit has been fully cleared, then instead of conventionally stopping the copier temporarily until one sorter unit is cleared, the copier now automatically switches into a pre-collation mode and continues copying, sending the pre-collated copy sets into the tray 60 instead of to the sorter units. As soon as one sorter unit is cleared, the copier then automatically switches back to post-collation copying at the beginning of the next document circulation to fill that bin. If the same condition reoccurs before the run is completed, the same automatic mode switching can be applied.

While the exemplary system described herein is presently considered to be preferred, various other modifications or improvements will be apparent to those skilled in the art. The following claims are intended to cover all such variations and modifications as fall within the true spirit and scope of the invention.

What is claimed is:

1. In a method of copying wherein a set of plural documents are circulated and copied a number of times corresponding to a selected plural number of copies, the improvement comprising:

switching between a selected one of the following different modes of operation;

a conventional post-collation mode of operation in which a number of identical copies corresponding to said selected number of copies are made from each document copied from the circulated document set, and these copies are forwarded to different individual bins of a sorting apparatus for collation in said sorting apparatus; and a pre-collation mode of operation using the same sorting apparatus in which the documents are plurally circulated by a number of times corresponding to the selected plural number of copies and copied once per circulation, in which mode of operation all the copies made from one said document circulation are placed in one said bin, but different said bins are used for different said document copying circulations so that each pre-collated copy set is individually placed in a different said bin of said sorting apparatus.

2. The copying method of claim 1 including a further pre-collation mode of operation in which all of the copies are collected in a separate common set collector.

3. The copying method of claims 1 or 2, wherein said switching between said different modes of operation is made automatically from a said pre-collation mode to a said post-collation mode in response to said selected number of copies exceeding a pre-set plural number.

4. In a method of copying in which a pre-collation mode of copying is provided wherein a set of documents may be multiply recirculated for single copying onto copy sheets by a number of circulations corresponding to the number of desired copies to produce copy sheets in pre-collated order, and alternatively a post-collation mode of copying is provided wherein the documents may be multiply copied during a circulation onto multiple uncollated copy sheets and forwarded to a sorting apparatus having a number of individual sorting bins for sorting said uncollated copies into said bins; and in which the number of copies to be made by said copier may be selected by actuating a copy counter control, the improvement comprising:

automatically switching between said pre-collation mode of copying and said post-collation mode of copying in response to said selection in said copy counter control of sa plural number of copies which exceeds a pre-set plural number corresponding to desired crossover copy count, so that when the selected number of copies is below said preset number the mode of document copying will be pre-collation, and when the selected number of copies is above said pre-set number the mode of copying will be post-collation.

5. The copying method of claim 4, wherein said preset crossover copy count is between approximately 20 and 50 copies.

6. The copying method of claims 4 or 5 comprising the further step of automatically initially producing one pre-collated copy set in said pre-collation mode of copying regardless of the selected number of copy sets.

7. The copying method of claims 4 or 5 further comprising forwarding individual pre-collated copy sets to different individual bins of said sorter in said pre-collation mode of copying.

8. The copying method of claim 7, wherein all of the copy sheets made in one said circulation of the document set are placed in one said bin of said sorting apparatus.

* * * * *

Disclaimer

4,212,457.—*Joachim Guenther*, Webster, N.Y. PRE/POST-COLLATION COPYING SYSTEM. Patent dated July 15, 1980. Disclaimer filed Mar. 30, 1981, by the assignee, *Xerox Corp.*

Hereby enters this disclaimer to claims 1 and 2 of said patent.

[*Official Gazette May 26, 1981.*]